United States Patent
Hung (10) Patent No.: US 8,508,072 B2
(45) Date of Patent: Aug. 13, 2013

(54) STANDBY WAKE-UP CIRCUIT FOR ELECTRONIC DEVICE

(75) Inventor: Kuen-Jen Hung, Hsin-Chu (TW)

(73) Assignee: AU Optronics Corp., Hsinchu (TW)

(*) Notice: Subject to any disclaimer, the term of this patent is extended or adjusted under 35 U.S.C. 154(b) by 210 days.

(21) Appl. No.: 13/207,597

(22) Filed: Aug. 11, 2011

(65) Prior Publication Data

US 2012/0161521 A1    Jun. 28, 2012

(30) Foreign Application Priority Data

Dec. 23, 2010   (TW) .............................. 99145601 A (51) Int. Cl.
*H02J 9/00* (2006.01)
(52) U.S. Cl.
USPC .............................. 307/64; 713/300; 713/320
(58) Field of Classification Search
USPC ......... 713/300, 320; 455/573, 574; 348/348, 348/208.16, 33.13, 372; 307/64
See application file for complete search history.

(56) References Cited

U.S. PATENT DOCUMENTS

| RE43,202 E | * | 2/2012 | Yoo ................................ 345/211 |
| 2006/0095800 A1 | * | 5/2006 | Iwamoto ....................... 713/300 |

FOREIGN PATENT DOCUMENTS

| CN | 201352831 | 11/2009 |
| TW | I285308 | 8/2007 |
| TW | 200905460 | 2/2009 |
| TW | I307243 | 3/2009 |
| TW | 200941429 | 10/2009 |

* cited by examiner

*Primary Examiner* — Rexford Barnie
*Assistant Examiner* — Rasem Mourad
(74) *Attorney, Agent, or Firm* — WPAT, PC; Justin King (57) ABSTRACT

A standby wake-up circuit is configured for determining whether to wake an electronic device which is powered by a power-supplying module. The power-supply module is able to supply a standby power to the electronic device when the electronic device is in standby, and supply a main power to the electronic device when the electronic device is wakened. The standby wake-up circuit comprises an input-signal detecting circuit and a processing module. The input-signal detecting circuit comprises a power-key detecting module, an input-signal detecting module, a multiplexer and a power controller. The power-key detecting module and the input-signal detecting module are configured for detecting whether a signal is inputted. When inputting the signal, the power controller sends out a waken signal for supplying the main power to the electronic device.

6 Claims, 6 Drawing Sheets

STANDBY WAKE-UP CIRCUIT FOR ELECTRONIC DEVICE

TECHNICAL FIELD

The present invention relates to the display field, and more particularly to a standby wake-up circuit adapted for electronic devices.

BACKGROUND

With the rapid development of the science and technology, liquid crystal display (LCD) has many advantages, such as high definition, light weight, small size, etc., and has gradually substituted conventional television to be a mainstream television. However, since most of the LCDs employ a micro-processor to control an operation flow in standby, it is difficult to meet the related rule of the European Union which rules that the power consumption of the television is no more than 0.5 Watt/Hour in standby. However, although most manufacturers pay much attention to reduce the power consumption of the micro-processor, they cannot achieve an excellent result since the LCD manufacturers are not skillful in the field of the micro-processor.

SUMMARY

Therefore, the object of the present invention is to provide a standby wake-up circuit for an electronic device, to make the electronic device meet the rules of the European Union in relation to the power consumption in standby.

The present invention provides a standby wake-up circuit which is configured for determining whether to wake an electronic device powered by a power-supplying module. The power-supplying module is able to supply a standby power to the electronic device when the electronic device is in standby, and to supply a main power to the electronic device when the electronic device is wakened. The standby wake-up circuit comprises an input-signal detecting circuit and a processing module. The input-signal detecting circuit comprises a power-key detecting module, an input-signal detecting module, a multiplexer and a power controller. The power-key detecting module has a power key, a first power-on signal terminal and a power-off signal terminal. The standby power is used as operation-energy sources of the power-key detecting module, the input-signal detecting module and the multiplexer. The first power-on signal terminal is enabled when the power key is adjusted to turn on the electronic device, and the power-off signal terminal is enabled when the power key is adjusted to turn off the electronic device. The input-signal detecting module has a signal-receiving terminal, a signal-outputting terminal and a second power-on signal terminal. The second power-on signal terminal is enabled when the signal-receiving terminal receives a signal, and the signal received by the signal-receiving terminal is outputted from the signal-outputting terminal. The multiplexer has a plurality of input terminals and an output terminal. The power-off signal terminal and the signal-outputting terminal are electrically coupled to a corresponding one of the input terminals of the multiplexer respectively. The multiplexer is configured for selecting one of signals received by the input terminals to the output terminal. The power controller is electrically coupled to the first power-on signal terminal, the second power-on signal terminal and the power-supplying module. The power controller is configured for generating a corresponding waken signal to the power-supplying module according to a state of one of the first power-on signal terminal and the second power-on signal terminal. The processing module is electrically coupled to the power-supplying module and the output terminal of the multiplexer. The main power is used as an operation-energy source of the processing module, and is configured for processing a signal outputted from the output terminal of the multiplexer.

In an exemplary embodiment of the present invention, the processing module comprises a register. The processing module sets the register with a first predetermined value when the power controller sends out the waken signal, and sets the register with a second predetermined value different from the first predetermined value when the power controller does not send out the waken signal.

The standby wake-up circuit of the present invention employs the power-key detecting module and the input-signal detecting module of the input-signal detecting circuit, such as an AV signal detecting module, a HDMI signal detecting module, a PC signal detecting module and an IR signal detecting module, to detect whether signals are inputted. When there are the signals inputted, the power controller of the input-signal detecting circuit generates the corresponding waken signal and outputs it to the main power-supplying module of the power-supplying module for supplying the main power to the processing module and the LCD, such that the LCD operates in normal. In addition, the present invention further detects the status value of the register of the processing module to judge whether there is any interaction between the user and the LCD, and to judge whether no interaction between the user and the LCD for a predetermined period. If no interaction between the user and the LCD for the predetermined period, the LCD enters in standby to meet the rules of the European Union.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
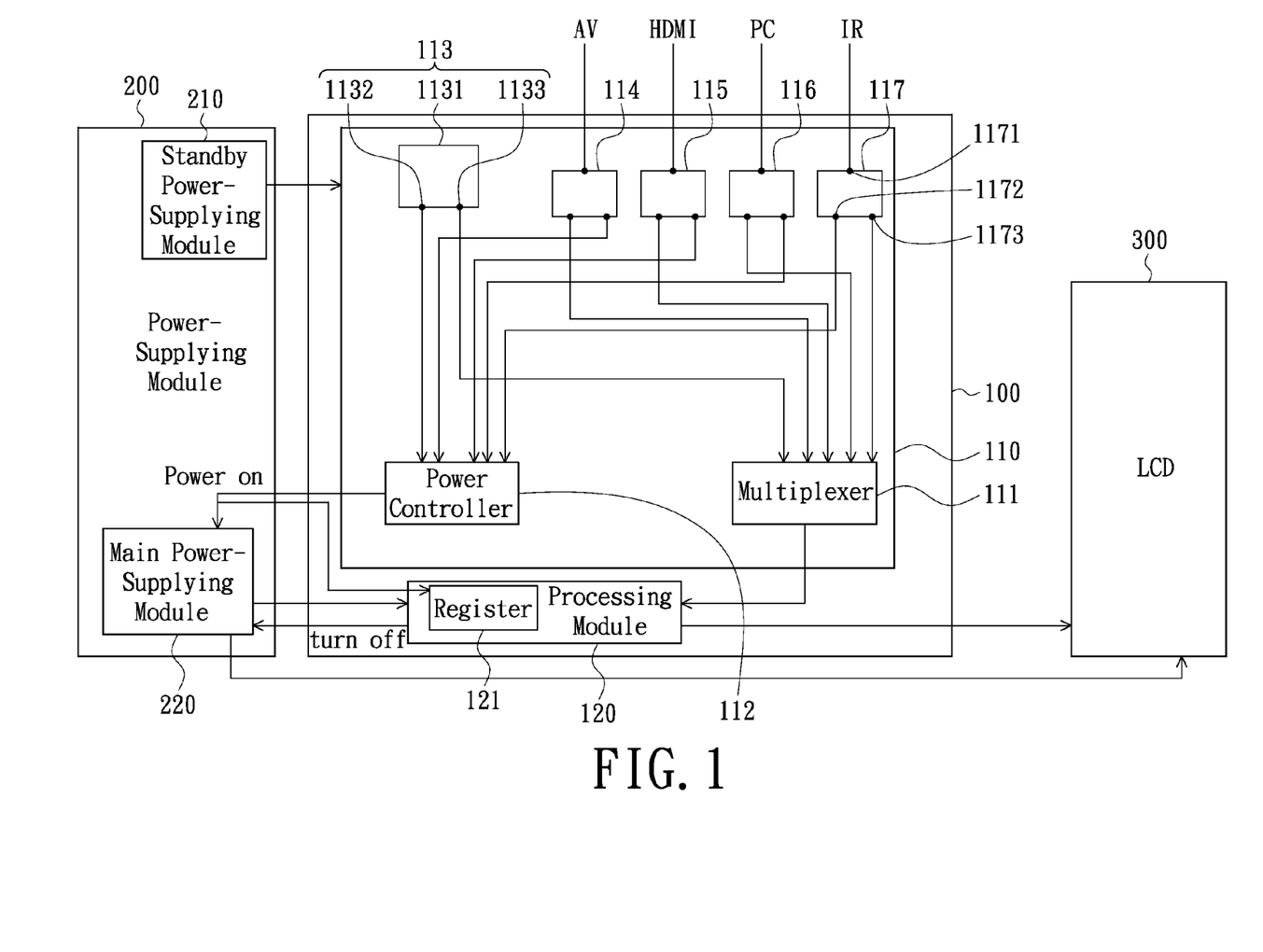
FIG. 1 is a schematic view of a standby wake-up circuit in accordance with an exemplary embodiment of the present invention.

FIG. 1 is a schematic view of a standby wake-up circuit for an electronic device in accordance with an exemplary embodiment of the present invention. Referring to FIG. 1, the standby wake-up circuit 100 is configured for determining whether to wake the electronic device, such as a currently popular LCD 300, which is powered by a power-supplying module 200. The power-supplying module 200 may be a power panel, and comprises a standby power-supplying module 210 and a main power-supplying module 220. The power-supplying module 200 may employ the standby power-supplying module 210 to supply a standby power to the LCD 300 when the LCD 300 is in standby mode, and employ the main power-supplying module 220 to supply a main power to the LCD 300 when the LCD300 is in wake-up mode.

The standby wake-up circuit 100 comprises an input-signal detecting circuit 110 and a processing module 120. The input-signal detecting circuit 110 is configured for detecting whether signals are inputted to the standby wake-up circuit 100. The input-signal detecting circuit 110 is electrically coupled to the standby power-supplying module 210 to use the standby power outputted from the standby power-supplying module 210 as an operation-energy source of the input-signal detecting circuit 110. The processing module 120 is electrically coupled to the main power-supplying module 220 and the input-signal detecting circuit 110, so as to receive the main power outputted from the main power-supplying module 220 as an operation-energy source of the processing module 120, when the input-signal detecting circuit 110 detects there is the signals inputted to the standby wake-up circuit 100.

In detail, the input-signal detecting circuit 110 comprises a multiplexer 111, a power controller 112, a power-key detecting module 113 and a plurality of input-signal detecting modules. The input-signal detecting modules may comprise an audio-video (AV) signal detecting module 114, a high-definition multimedia interface (HDMI) signal detecting module 115, a personal-computer (PC) signal detecting module 116 and an infrared-ray (IR) signal detecting module 117, etc.

The power-key detecting module 113 comprises a power key 1131, a first power-on signal terminal 1132 and a power-off signal terminal 1133. The power key 1131 may be any one of various switchers, and is configured for turning on/off the LCD 300. The first power-on signal terminal 1132 is electrically coupled to the power controller 112, and the power-off signal terminal 1133 is electrically coupled to the multiplexer 111. When the power key 1131 is adjusted to turn on the LCD 300, the first power-on signal terminal 1132 is enabled. When the power key 1131 is adjusted to turn off the LCD 300, the power-off signal terminal 1133 is enabled.

Each of the input-signal detecting modules, such as the AV signal detecting module 114, the HDMI signal detecting module 115, the PC signal detecting module 116 and the IR signal detecting module 117, etc., comprises a signal-receiving terminal, such as 1171, a second power-on signal terminal, such as 1172, and a signal-outputting terminal, such as 1173, respectively. Signal receiving terminals of the input-signal detecting modules are configured for receiving various input signals, such as AV signals, HDMI signals, PC signals and IR signals, respectively. Signal outputting terminals of the input-signal detecting modules are electrically coupled to the multiplexer 111 respectively, and second power-on signal terminals of the input-signal detecting modules are electrically coupled to the power controller 112 respectively. When the signal-receiving terminal of a corresponding one of the input-signal detecting modules receives the input signals, the second power-on signal terminal of the corresponding one of the input-signal detecting modules is enabled and outputs an enable signal to the power controller 112. Furthermore, the corresponding input-signal detecting module outputs the input signals received from the signal-receiving terminal, to the multiplexer 111 from the signal-outputting terminal of the corresponding input-signal detecting module.

The multiplexer 111 comprises a plurality of input terminals (not labeled) and an output terminal (not labeled). The power-off signal terminal of the power-key detecting module 113 and the signal-outputting terminals of the input-signal detecting module such as the AV signal detecting module 114, the HDMI signal detecting module 115, the PC signal detecting module 116 and the IR signal detecting module 117, are electrically coupled to the input terminals of the multiplexer 111 respectively. The output terminal of the multiplexer 111 is electrically coupled to the processing module 120, to select one of the signals received by the multiplexer 111 to the processing module 120.

The power controller 112 is electrically coupled to the first power-on signal terminal 1132 of the power-key detecting module 113, the second power-on signal terminals of the input-signal detecting modules, such as the AV signal detecting module 114, the HDMI signal detecting module 115, the PC signal detecting module 116 and the IR signal detecting module 117, and the main power-supplying module 220 of the power-supplying module 200. Thus the power controller 112 may generate a corresponding waken signal Power on to the main power-supplying module 220 according to statuses of the first power-on signal terminal 1132 or the second power-on signal terminals.

The standby wake-up circuit 100 uses the input-signal detecting modules of the input-signal detecting circuit 110, such as the AV signal detecting module 114, the HDMI signal detecting module 115, the PC signal detecting module 116 and the IR signal detecting module 117, to detect whether signals are inputted therein. When there are the signals inputted therein, the power controller 112 of the input-signal detecting circuit 110 generates the corresponding waken signal Power on and outputs it to the main power-supplying module 220 of the power-supplying module 200, for supplying the main power to the processing module 120 and the LCD 300, such that the LCD 300 is waken and operates in normal.

In addition, the processing module 120 may further comprise a register 121 electrically coupled to the power controller 112 to detect whether the power controller 112 sends out the waken signal Power On.

Figure 2:
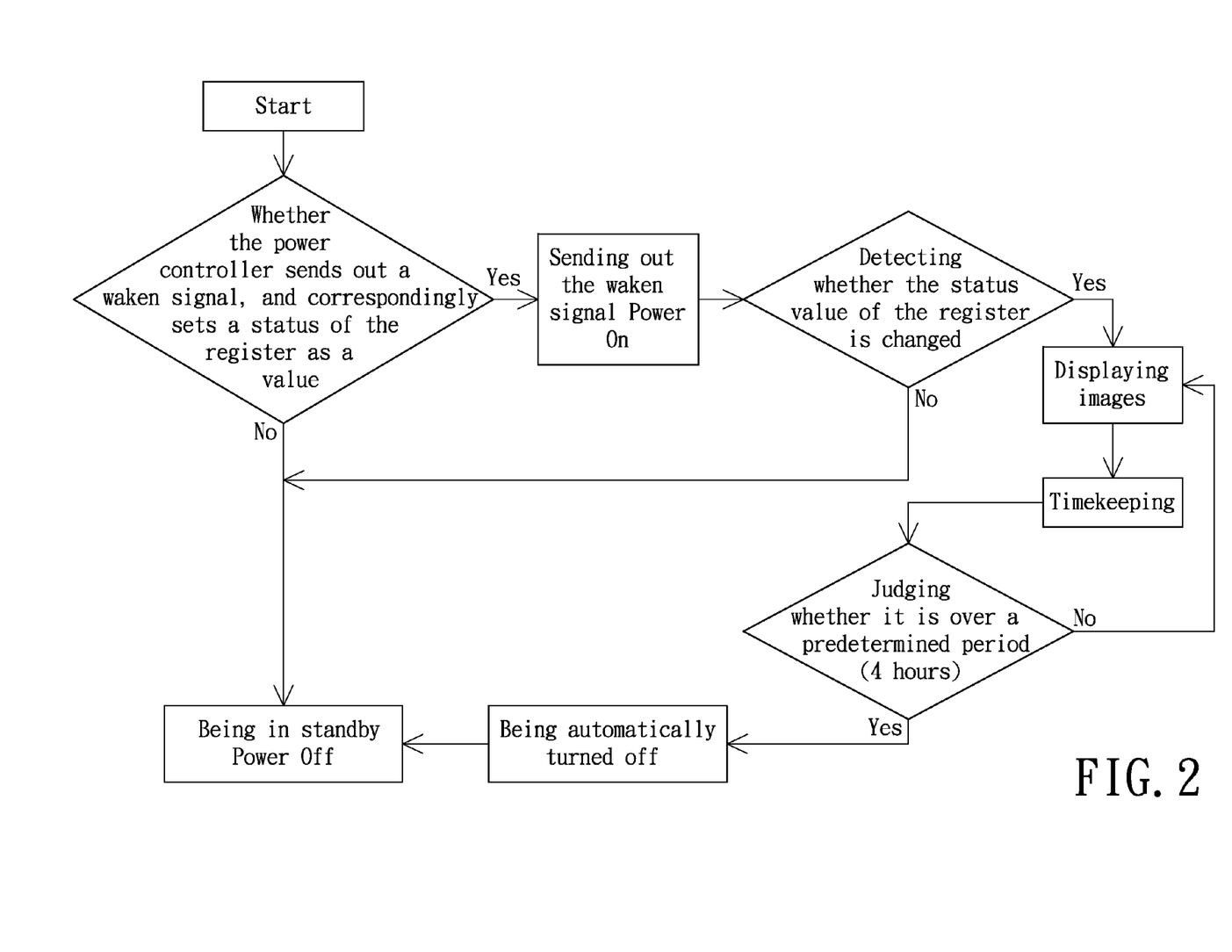
FIG. 2 is a flow chart of an operation of the standby wake-up circuit as shown in FIG. 1.

FIG. 2 is a flow chart of the operation of the standby wake-up circuit as shown in FIG. 1. Referring to FIG. 2, when the power controller 112 sends out the waken signal Power On, the power-supplying module 200 supplies the main power to wake the LCD 300, and the processing module 120 may set the status of the register 121 as a first predetermined value, such as logic value 1. When the power controller 112 does not send out the waken signal Power On, the LCD 300 is still in standby mode, and the processing module 120 may set the status of the register 121 as a second predetermined value different from the first predetermined value, such as logic value 0. The processing module 120 can determine whether the signal, such as the IR signal, is inputted therein by detecting the status value of the register 121 and judging whether the status value of the register is changed. Furthermore, if no signal is inputted for a predetermined period, such as 4 hours, after turning on the LCD 300, that is, there is no any interaction between the user and the LCD 300 and/or channel switch of the LCD 300 for more than 4 hours, the processing module 120 may send out a turning-off signal (turn off) to the main power-supplying module 220 of the power-supplying module 200 to stop supplying the main power, such that the LCD 300 enters in standby mode.

Figure 3:
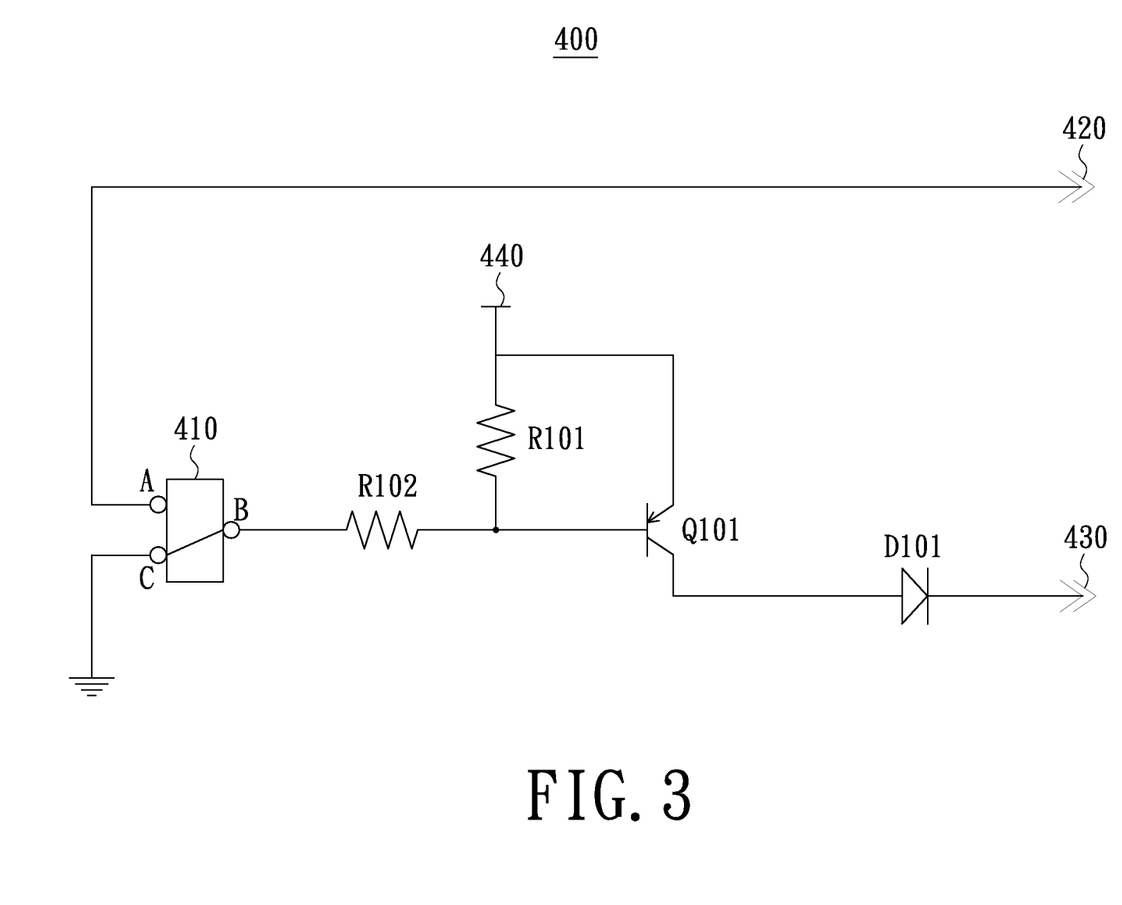
FIG. 3 is a circuit schematic view of a power-key detecting module in accordance with an exemplary embodiment of the present invention.

FIG. 3 is a circuit schematic view of the power-key detecting module as shown in FIG. 1. Referring to FIG. 3, the power key 410 of the power-key detecting module 400 comprises a fixed terminal B, a first switching terminal C and a second switching terminal A. The first switching terminal C is electrically coupled to the ground, and the second switching terminal A is electrically coupled to the power-off signal terminal 420.

In addition, the power-key detecting module 400 further comprises an operation-power terminal 440, a resistor R101, a resistor R102, a P-type transistor Q101 and a diode D101. The operation-power terminal 440 is electrically coupled to the standby power-supplying module 210 of the power-supplying module 200 to receive the standby power. A terminal of the resistor R101 is electrically coupled to the operation-power terminal 440, and another terminal of the resistor R101 is electrically coupled to a terminal of the resistor R102 and a gate terminal of the P-type transistor Q101. Another terminal of the resistor R102 is electrically coupled to the fixed terminal B of the power key 410. A source terminal of the P-type transistor Q101 is electrically coupled to the operation-power terminal 440, and a drain terminal of the P-type transistor Q101 is electrically coupled to a positive terminal of the diode D101. In addition, a negative terminal of the diode D101 is electrically coupled to the first power-on signal terminal 430 to determine the status of the first power-on signal terminal 430.

When the power key 410 is adjusted to turn on the LCD 300 as shown in FIG. 1, the fixed terminal B of the power key 410 is adjusted to be electrically coupled to the first switching terminal C. At the moment, the gate terminal of the P-type transistor Q101 is electrically coupled to the ground, thus the P-type transistor Q101 is turned on. The drain terminal of the P-type transistor Q101 can receive the standby power transmitted from the source terminal of the P-type transistor Q101, thus the first power-on signal terminal 430 can output a high potential. That is, the first power-on signal terminal 430 can output the waken signal Power On at the moment. On the contrary, when the power key 410 is adjusted to turn off the LCD 300 as shown in FIG. 1, the fixed terminal B of the power key 410 is adjusted to be electrically coupled to the second switching terminal A. At the moment, the gate terminal of the P-type transistor Q101 is not electrically coupled to the ground, and receives the standby power transmitted from the operation-power terminal 440, thus the P-type transistor Q101 is turned off, and the drain terminal of the P-type transistor Q101 does not receive the standby power transmitted from the source terminal of the P-type transistor Q101. Therefore, the first power-on signal terminal 430 can output a low potential, that is, the first power-on signal terminal 430 does not output the waken signal Power On.

Figure 4:
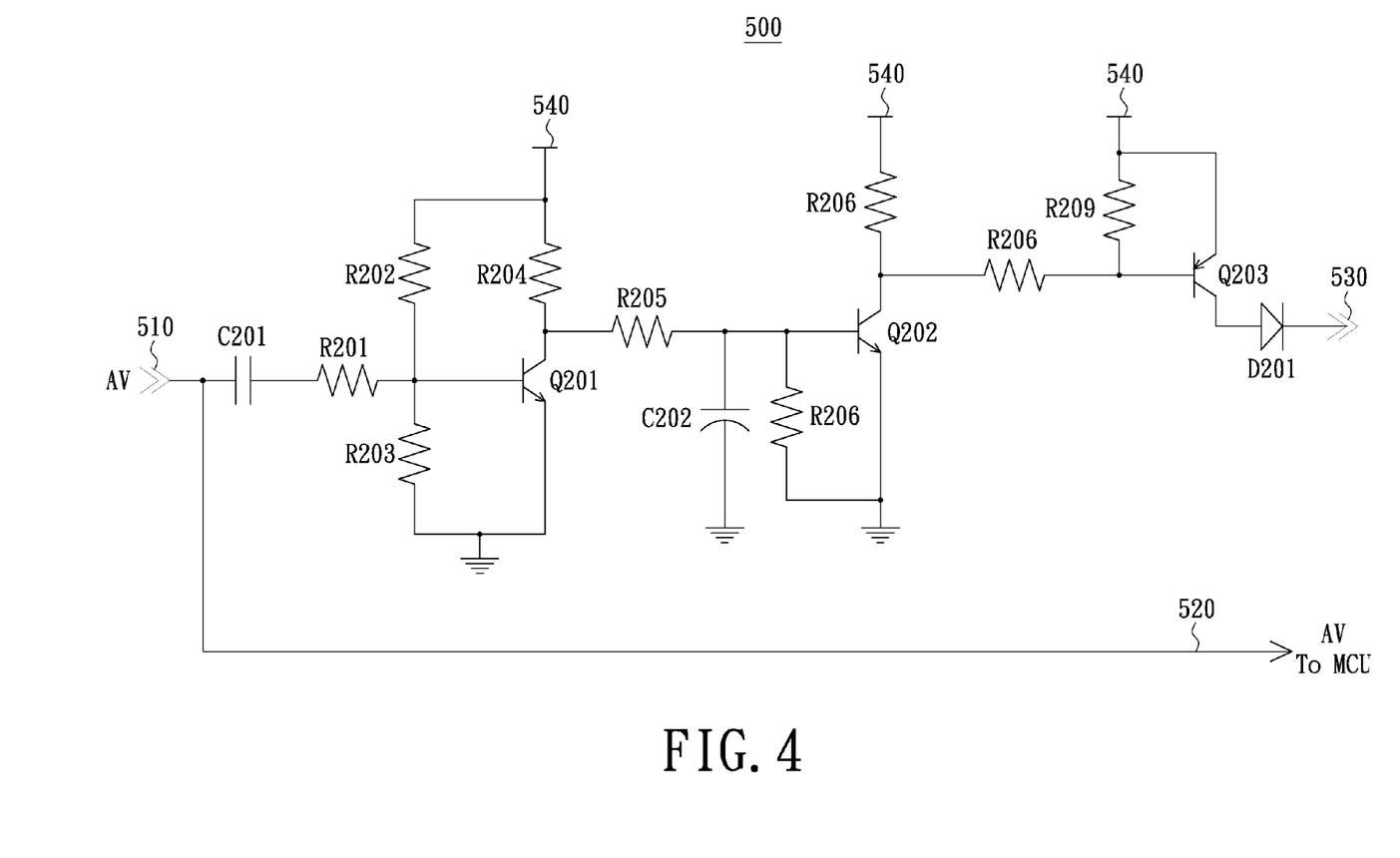
FIG. 4 is a circuit schematic view of an input-signal detecting module in accordance with an exemplary embodiment of the present invention.

FIG. 4 is a circuit schematic view of an input-signal detecting module in accordance with an exemplary embodiment of the present invention. In the exemplary embodiment, the input-signal detecting module 500 may be the AV signal detecting module 114 as shown in FIG. 1, a signal-receiving terminal 510 of the input-signal detecting module 500 is configured for receiving the AV signals, and the signal-outputting terminal 520 is electrically coupled to the signal-receiving terminal 510.

In addition, the AV signal detecting module 500 may further comprise an operation-power terminal 540, a capacitor C201, a resistor R201, a resistor R202, a resistor R203, a resistor R204, a N-type transistor Q201, a resistor R205, a capacitor C202, a resistor R206, a resistor R207, a N-type transistor Q202, a resistor R208, a resistor R209, a P-type transistor Q203 and a diode D201. The operation-power terminal 540 is electrically coupled to the standby power-supplying module 210 of the power-supplying module 200 as shown in FIG. 1 to receive the standby power. The capacitor C201 and the resistor R201 are electrically coupled between the signal-receiving terminal 510 and a gate terminal of the N-type transistor Q201. The resistor R202 is electrically coupled between the operation-power terminal 540 and the gate terminal of the N-type transistor Q201, and the resistor R203 is electrically coupled between the gate terminal of the N-type transistor Q201 and the ground. A source terminal of the N-type transistor Q201 is electrically coupled to the ground, and a drain terminal of the N-type transistor Q201 is electrically coupled to the operation-power terminal 540 through the resistor R204. The resistor R205 is electrically coupled between the drain terminal of the N-type transistor Q201 and a gate terminal of the N-type transistor Q202. The capacitor C202 is electrically coupled between the gate terminal of the N-type transistor Q202 and the ground, and the resistor R206 is also electrically coupled between the gate terminal of the N-type transistor Q202 and the ground. A source terminal of the N-type transistor Q202 is electrically coupled to the ground, and a drain terminal of the N-type transistor Q202 is electrically coupled to the operation-power terminal 540 through the resistor R207. The resistor R208 is electrically coupled between the drain terminal of the N-type transistor Q202 and a gate terminal of the P-type transistor Q203, and the resistor R209 is electrically coupled between the gate terminal of the P-type transistor Q203 and the operation-power terminal 540. A source terminal of the P-type transistor Q203 is electrically coupled to the operation-power terminal 540, and a drain terminal of the P-type transistor Q203 is electrically coupled to a positive terminal of the diode D201. A negative terminal of the diode D201 is electrically coupled to the second power-on signal terminal 530.

When the signal-receiving terminal 510 of the AV signal detecting module 500 receives the AV signals, the N-type transistor Q201 is turned on. At the moment, the gate terminal of the N-type transistor Q202 is electrically coupled to the ground through the turning-on N-type transistor Q201, and the N-type transistor Q202 is turned off. The gate terminal of the P-type transistor Q203 receives the standby power transmitted from the operation-power terminal 540, thus the P-type transistor Q203 is turned off, and the drain terminal of the P-type transistor Q203 does not receives the standby power transmitted from the source terminal of the P-type transistor Q203. Therefore, the second power-on signal terminal 530 outputs a low potential, that is, the AV signal detecting module 500 of the exemplary embodiment outputs the waken signal Power On when receiving the low potential.

On the contrary, when the signal-receiving terminal 510 of the AV signal detecting module 500 does not receiving the AV signal, the N-type transistor Q201 is turned off. At the moment, the gate terminal of the N-type transistor Q202 receives the standby power transmitted from the operation-power terminal 540 through the resistor R204 and the resistor R205, and the N-type transistor Q202 is turned on. At the moment, the gate terminal of the P-type transistor Q203 is electrically coupled to the ground through the turning-on N-type transistor Q202, thus the P-type transistor Q203 is turned on. Therefore, the drain terminal of the P-type transistor Q203 receives the standby power transmitted from the source terminal of the P-type transistor Q203, and the second power-on signal terminal 530 outputs a high potential. Thus the AV signal detecting module 500 will not output the waken signal Power On.

Figure 5:
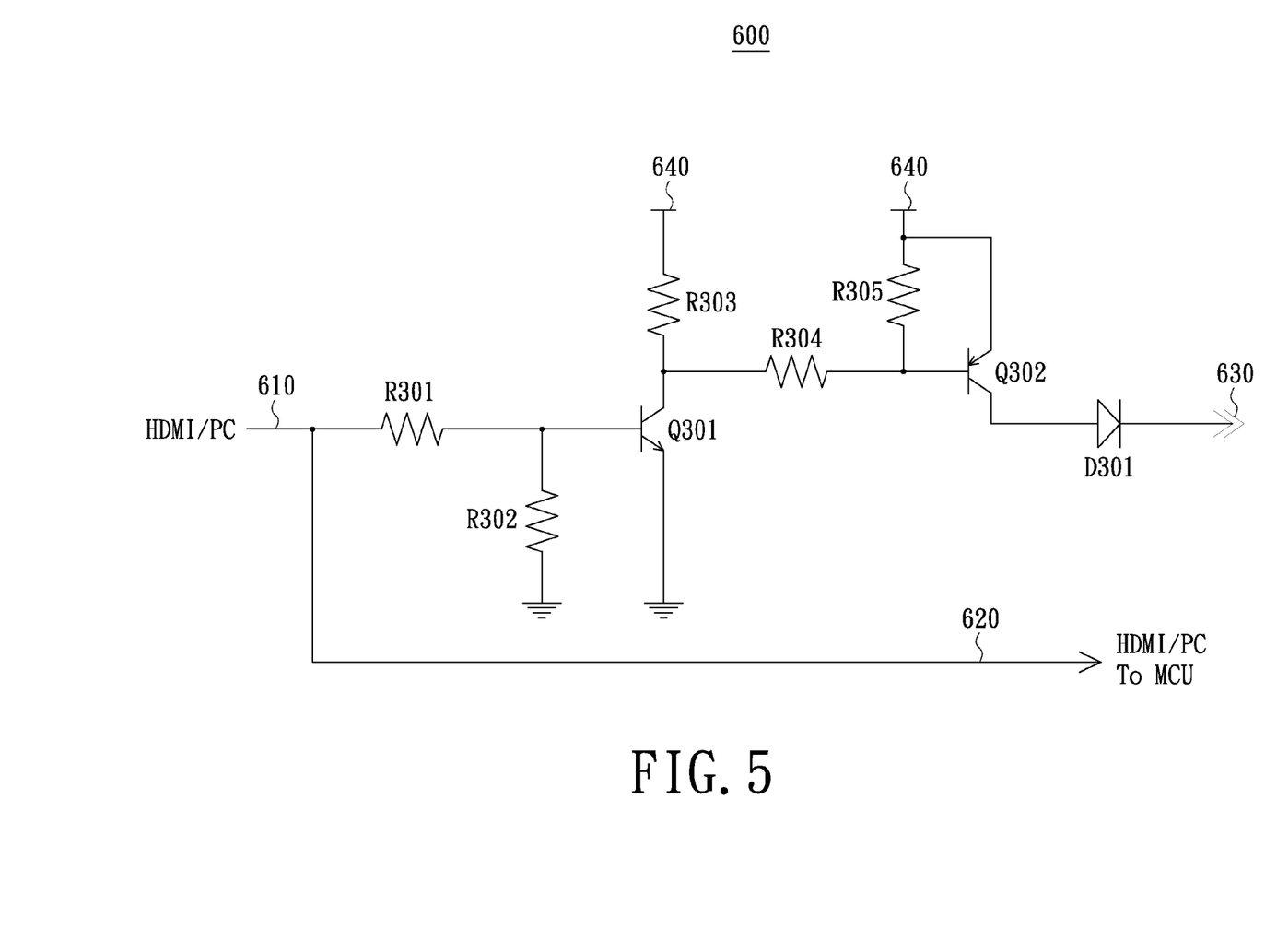
FIG. 5 is a circuit schematic view of an input-signal detecting module in accordance with another exemplary embodiment of the present invention.

FIG. 5 is a circuit schematic view of an input-signal detecting module in accordance with another exemplary embodiment of the present invention. In the exemplary embodiment, the input-signal detecting module 600 may be configured for detecting whether wire signals, such as the HDMI signals or the PC signals, are inputted therein. That is, the input-signal detecting module 600 of the exemplary embodiment may be the HDMI signal detecting module 115 or the PC signal detecting module 116 as shown in FIG. 1. The signal-receiving terminal 610 of the input-signal detecting module 600 is configured for receiving the HDMI signals or the PC signals, and the signal-outputting terminal 620 is electrically coupled to the signal-receiving terminal 610.

In addition, the input-signal detecting module 600 may further comprise an operation-power terminal 640, a resistor R301, a resistor R302, a N-type transistor Q301, a resistor R303, a resistor R304, a resistor R305, a P-type transistor Q302 and a diode D301. The operation-power terminal 640 is electrically coupled to the standby power-supplying module 210 of the power-supplying module 200 as shown in FIG. 1 to receive the standby power. The resistor R301 is electrically coupled between the signal-receiving terminal 610 and a gate terminal of the N-type transistor Q301. The resistor R302 is electrically coupled to the gate terminal of the N-type transistor Q301 and the ground. A source terminal of the N-type transistor Q301 is electrically coupled to the ground, and a drain terminal of the N-type transistor Q301 is electrically coupled to the operation-power terminal 640 through the resistor R303. The resistor R304 is electrically coupled between the drain terminal of the N-type transistor Q301 and a gate terminal of the P-type transistor Q302. The resistor R305 is electrically coupled to the gate terminal of the P-type transistor Q302 and the operation-power terminal 640. A source terminal of the P-type transistor Q302 is electrically coupled to the operation-power terminal 640, and a drain terminal of the P-type transistor Q302 is electrically coupled to a positive terminal of the diode D301. A negative terminal of the diode D301 is electrically coupled to the second power-on signal terminal 630.

When the wire signals, such as the HDMI signals or the PC signals, are detected by the input-signal detecting module 600, the waken signal is outputted by the second power-on signal terminal 630 to the main power-supplying module 220 as shown in FIG. 1 such that the main power-supplying module 220 supplies the main power to the processing module 120 as shown in FIG. 1. The wire signals are transmitted to the processing module 120 through the signal-outputting terminal 620 and the multiplexer 111 as shown in FIG. 1. When no wire signal is detected by the input-signal detecting module 600, no waken signal Power On is outputted by the second power-on signal terminal 630, and the processing module 120 is still in standby mode.

Figure 6:
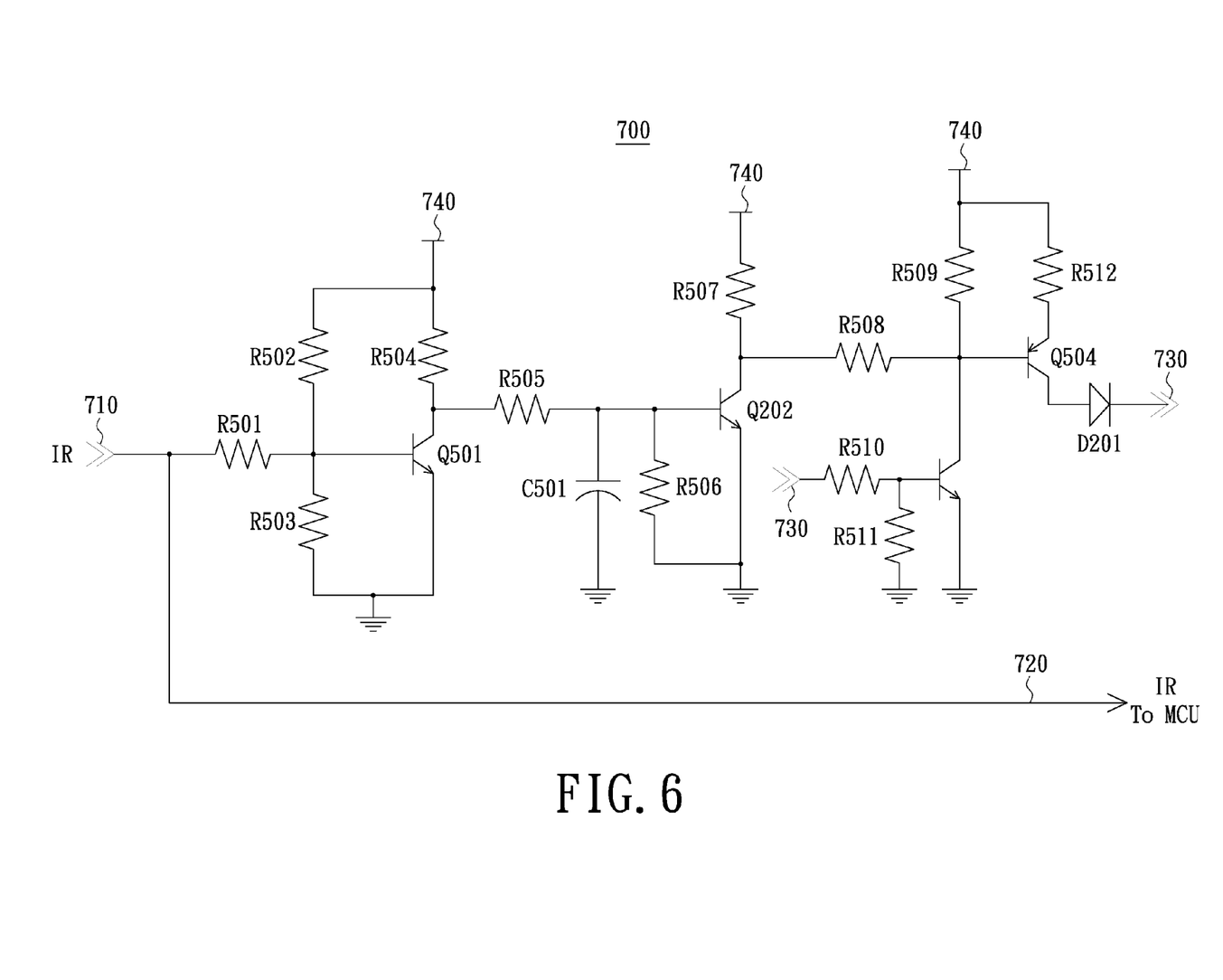
FIG. 6 is a circuit schematic view of an input-signal detecting module in accordance with other exemplary embodiment of the present invention.

FIG. 6 is a circuit schematic view of an input-signal detecting module in accordance with other exemplary embodiment of the present invention. In the exemplary embodiment, the input-signal detecting module 700 may be configured for detecting whether wireless signals are inputted therein, such as the IR signals. That is, the input-signal detecting module 700 may be the IR signal detecting module 117 as shown in FIG. 1. The signal-receiving terminal 710 of the IR signal detecting module 700 receives the IR signals, and the signal-outputting terminal 720 of the IR signal detecting module 700 is electrically coupled to the signal-receiving terminal 710 to transmit the IR signals to the processing module 120 through the multiplexer 111 as shown in FIG. 1.

In addition, the IR signal detecting module 700 may further comprise an operation-power terminal 740, a resistor R501, a resistor R502, a resistor R503, a resistor R504, a N-type transistor Q501, a resistor R505, a capacitor C501, a resistor R506, a resistor R507, a N-type transistor Q502, a resistor R508, a resistor R509, a P-type transistor Q504, a resistor R512, a diode D501, a resistor R510, a resistor R511 and a N-type transistor Q503.

In detail, the operation-power terminal 740 is electrically coupled to the standby power-supplying module 210 of the power-supplying module 200 to receive the standby power. The resistor R501 is electrically coupled between the signal-receiving terminal 710 and the gate terminal of the N-type transistor Q501. The resistor R502 is electrically coupled between the operation-power terminal 740 and the gate terminal of the N-type transistor Q501, and the resistor R503 is electrically coupled between the gate terminal of the N-type transistor Q501 and the ground. A source terminal of the N-type transistor Q501 is electrically coupled to the ground, and a drain terminal of the N-type transistor Q501 is electrically coupled to the operation-power terminal 740 through the resistor R504. The resistor R505 is electrically coupled between the drain terminal of the N-type transistor Q501 and a gate terminal of the N-type transistor Q502. The capacitor C501 is electrically coupled between the gate terminal of the N-type transistor Q502 and the ground, and the resistor R506 is also electrically coupled between the gate terminal of the N-type transistor Q502 and the ground. A source terminal of the N-type transistor Q502 is electrically coupled to the ground, and a drain terminal of the N-type transistor Q502 is electrically coupled to the operation-power terminal 740 through the resistor R507. The resistor R508 is electrically coupled between the drain terminal of the N-type transistor Q502 and a gate terminal of the P-type transistor Q504, and the resistor R509 is electrically coupled between the gate terminal of the P-type transistor Q504 and the operation-power terminal 740. A source terminal of the P-type transistor Q504 is electrically coupled to the operation-power terminal 740 through the resistor R512, and a drain terminal of the P-type transistor Q504 is electrically coupled to a positive terminal of the diode D501. A negative terminal of the diode D501 is electrically coupled to the second power-on signal terminal 730. In addition, the resistor R510 is electrically coupled between the second power-on signal terminal 730 and a gate terminal of the N-type transistor Q503, and the resistor R511 is electrically coupled to the gate terminal of the N-type transistor Q503 and the ground. A source terminal of the N-type transistor Q503 is electrically coupled to the ground, and a drain terminal of the N-type transistor Q503 is electrically coupled to the gate terminal of the P-type transistor Q504.

When the IR signals is received by the signal-receiving terminal 710 of the IR signal detecting module 700, the waken signal Power On is generated by the related circuit at the second power-on signal terminal 730 according to the IR signals, and transmitted to the main power-supplying module 220 as shown in FIG. 1, such that the main power-supplying module 220 supplies the main power to the processing module as shown in FIG. 1, and the IR signals are transmitted by the signal-outputting terminal 720 to the processing module 120 through the multiplexer 111 as shown in FIG. 1. When no IR signal is detected by the signal-receiving terminal 710 of the IR signal detecting module 700, no waken signal Power On is generated by the second power-on signal terminal 730.

In summary, the present invention does not directly use the micro-processor as an operation controlling unit of the electronic device in standby mode, but uses the circuit consisted of some passive elements to monitor whether outer signals are inputted. Thus the electronic device does not need supplying the power to the micro-processor in standby to make the micro-processor operate, and it meets the rules for saving the power in standby mode.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A standby wake-up circuit configured for determining whether to wake an electronic device powered by a power-supplying module, the power-supplying module being able to supply a standby power to the electronic device when the electronic device is in standby, and supply a main power to the electronic device when the electronic device is waken, the standby wake-up circuit comprising:
   an input-signal detecting circuit, comprising:
      a power-key detecting module having a power key, a first power-on signal terminal and a power-off signal terminal, the standby power being used as an operation-energy source of the power-key detecting module, the first power-on signal terminal being enabled when the power key is adjusted to turn on the electronic device, and the power-off signal terminal being enabled when the power key is adjusted to turn off the electronic device;
      an input-signal detecting module having a signal-receiving terminal, a signal-outputting terminal and a second power-on signal terminal, the standby power being used as an operation-energy source of the input-signal detecting module, the second power-on signal terminal being enabled when the signal-receiving terminal receiving a signal, and the signal received by the signal-receiving terminal being outputted from the signal-outputting terminal;
      a multiplexer having a plurality of input terminals and an output terminal, the standby power being used as an operation-energy source of the multiplexer, the power-off signal terminal and the signal-outputting terminal being electrically coupled to a corresponding one of the input terminals of the multiplexer respectively, the multiplexer being configured for selecting one of signals received by the input terminals to the output terminal; and
      a power controller electrically coupled to the first power-on signal terminal, the second power-on signal terminal and the power-supplying module, the power controller being configured for generating a corresponding waken signal to the power-supplying module according to a status of one of the first power-on signal terminal and the second power-on signal terminal; and
   a processing module electrically coupled to the power-supplying module and the output terminal of the multiplexer, the main power being used as an operation-energy source of the processing module, and being configured for processing a signal outputted from the output terminal of the multiplexer.

2. The standby wake-up circuit according to claim 1, wherein the power key comprises a fixed terminal, a first switching terminal and a second switching terminal, the first switching terminal is electrically coupled to the ground, the second switching terminal is electrically coupled to the power-off signal terminal, and the power-key detecting module further comprises:
   an operation-power terminal electrically coupled to the power-supplying module to receive the standby power;
   a first resistor having a first terminal and a second terminal, the first terminal of the first resistor being electrically coupled to the operation-power terminal;
   a second resistor having a first terminal and a second terminal, the first terminal of the second resistor being electrically coupled to the fixed terminal of the power key, and the second terminal of the second resistor being electrically coupled to the second terminal of the first resistor;
   a P-type transistor having a gate terminal, a source terminal and a drain terminal, the gate terminal of the P-type transistor being electrically coupled to the second terminal of the first resistor, and the source terminal of the P-type transistor being electrically coupled to the operation-power terminal; and
   a diode having a positive terminal and a negative terminal, the positive terminal of the diode being electrically coupled to the drain terminal of the P-type transistor, and the negative terminal of the diode being electrically coupled to the first power-on signal terminal,
   wherein the fixed terminal is electrically coupled to the first switching terminal when the power key is adjusted to turn on the electronic device, and the fixed terminal is electrically coupled to the second switching terminal when the power key is adjusted to turn off the electronic device.

3. The standby wake-up circuit according to claim 1, wherein the signal-receiving terminal of the input-signal detecting module is configured for receiving audio-video (AV) signals, the signal-receiving terminal of the input-signal detecting module is electrically coupled to the signal-outputting terminal, and the input-signal detecting module further comprises:
   an operation-power terminal electrically coupled to the power-supplying module to receive the standby power;
   a first capacitor having a first terminal and a second terminal, the first terminal of the first capacitor being electrically coupled to the signal-receiving terminal;
   a first resistor having a first terminal and a second terminal, the first terminal of the first resistor being electrically coupled to the second terminal of the first capacitor;
   a second resistor having a first terminal and a second terminal, the first terminal of the second resistor being electrically coupled to the operation-power terminal, and the second terminal of the second resistor being electrically coupled to the second terminal of the first resistor;
   a third resistor having a first terminal and a second terminal, the first terminal of the third resistor being electrically coupled to the ground, and the second terminal of the third resistor being electrically coupled to the second terminal of the first resistor;
   a fourth resistor having a first terminal and a second terminal, the first terminal of the fourth resistor being electrically coupled to the operation-power terminal;
   a first N-type transistor having a gate terminal, a source terminal and a drain terminal, the gate terminal of the first N-type transistor being electrically coupled to the second terminal of the first resistor, the source terminal of the first N-type transistor being electrically coupled to the ground, and the drain terminal of the first N-type transistor being electrically coupled to the second terminal of the fourth resistor;

a fifth resistor having a first terminal and a second terminal, the first terminal of the fifth resistor being electrically coupled to the second terminal of the fourth resistor;

a second capacitor having a first terminal and a second terminal, the first terminal of the second capacitor being electrically coupled to the second terminal of the fifth resistor, and the second terminal of the second capacitor being electrically coupled to the ground;

a sixth resistor having a first terminal and a second terminal, the first terminal of the sixth resistor being electrically coupled to the second terminal of the fifth resistor, and second terminal of the sixth resistor being electrically coupled to the ground;

a seventh resistor having a first terminal and a second terminal, the first terminal of the seventh resistor being electrically coupled to the operation-power terminal;

a second N-type transistor having a gate terminal, a source terminal and a drain terminal, the gate terminal of the second N-type transistor being electrically coupled to the second terminal of the fifth resistor, the source terminal of the second N-type transistor being electrically coupled to the ground, and the drain terminal of the second N-type transistor being electrically coupled to the second terminal of the seventh resistor;

an eighth resistor having a first terminal and a second terminal, the first terminal of the eighth resistor being electrically coupled to the second terminal of the seventh resistor;

a ninth resistor having a first terminal and a second terminal, the first terminal of the ninth resistor being electrically coupled to the operation-power terminal, and the second terminal of the ninth resistor being electrically coupled to the second terminal of the eighth resistor;

a P-type transistor having a gate terminal, a source terminal and a drain terminal, the gate terminal of the P-type transistor being electrically coupled to the second terminal of the eighth resistor, and the source terminal of the P-type transistor being electrically coupled to the operation-power terminal; and a diode having a positive terminal and a negative terminal, the positive terminal of the diode being electrically coupled to the drain terminal of the P-type transistor, and the negative terminal of the diode being electrically coupled to the second power-on signal terminal.

4. The standby wake-up circuit according to claim 1, wherein the signal-receiving terminal of the input-signal detecting module is configured for receiving wire signals, the signal-receiving terminal of the input-signal detecting module is electrically coupled to the signal-outputting terminal, and the input-signal detecting module further comprises:

an operation-power terminal electrically coupled to the power-supplying module to receive the standby power;

a first resistor having a first terminal and a second terminal, the first terminal of the first resistor being electrically coupled to the signal-receiving terminal;

a second resistor having a first terminal and a second terminal, the first terminal of the second resistor being electrically coupled to the second terminal of the first resistor, and the second terminal of the second resistor being electrically coupled to the ground;

a N-type transistor having a gate terminal, a source terminal and a drain terminal, the gate terminal of the N-type transistor being electrically coupled to the second terminal of the first resistor, and the source terminal of the N-type transistor being electrically coupled to the ground;

a third resistor having a first terminal and a second terminal, the first terminal of the third resistor being electrically coupled to the operation-power terminal, and the second terminal of the third resistor being electrically coupled to the drain terminal of the N-type transistor;

a fourth resistor having a first terminal and a second terminal, the first terminal of the fourth resistor being electrically coupled to the drain terminal of the N-type transistor;

a fifth resistor having a first terminal and a second terminal, the first terminal of the fifth resistor being electrically coupled to the operation-power terminal, and the second terminal of the fifth resistor being electrically coupled to the second terminal of the fourth resistor;

a P-type transistor having a gate terminal, a source terminal and a drain terminal, the gate terminal of the P-type transistor being electrically coupled to the second terminal of the fourth resistor, and the source terminal of the P-type transistor being electrically coupled to the operation-power terminal; and a diode having a positive terminal and a negative terminal, the positive terminal of the diode being electrically coupled to the drain terminal of the P-type transistor, and the negative terminal of the diode being electrically coupled to the second power-on signal terminal.

5. The standby wake-up circuit according to claim 1, wherein the signal-receiving terminal of the input-signal detecting module is configured for receiving wireless signals, the signal-receiving terminal of the input-signal detecting module is electrically coupled to the signal-outputting terminal, and the input-signal detecting module further comprises:

an operation-power terminal electrically coupled to the power-supplying module to receive the standby power;

a first resistor having a first terminal and a second terminal, the first terminal of the first resistor being electrically coupled to the signal-receiving terminal;

a second resistor having a first terminal and a second terminal, the first terminal of the second resistor being electrically coupled to the operation-power terminal, and the second terminal of the second resistor being electrically coupled to the second terminal of the first resistor;

a third resistor having a first terminal and a second terminal, the first terminal of the third resistor being electrically coupled to the ground, and the second terminal of the third resistor being electrically coupled to the second terminal of the first resistor;

a fourth resistor having a first terminal and a second terminal, the first terminal of the fourth resistor being electrically coupled to the operation-power terminal;

a first N-type transistor having a gate terminal, a source terminal and a drain terminal, the gate terminal of the first N-type transistor being coupled to the second terminal of the first resistor, the source terminal of the first N-type transistor being electrically coupled to the ground, and the drain terminal of the first N-type transistor being electrically coupled to the second terminal of the fourth resistor;

a fifth resistor having a first terminal and a second terminal, the first terminal of the fifth resistor being electrically coupled to the second terminal of the fourth resistor;

a capacitor having a first terminal and a second terminal, the first terminal of the capacitor being electrically coupled to the second terminal of the fifth resistor, and the second terminal of the capacitor being electrically coupled to the ground;

a sixth resistor having a first terminal and a second terminal, the first terminal of the sixth resistor being electrically coupled to the second terminal of the fifth resistor, and the second terminal of the sixth resistor being electrically coupled to the ground;

a seventh resistor having a first terminal and a second terminal, the first terminal of the seventh resistor being electrically coupled to the operation-power terminal;

a second N-type transistor having a gate terminal, a source terminal and a drain terminal, the gate terminal of the second N-type transistor being electrically coupled to the second terminal of the fifth resistor, the source terminal of the second N-type transistor being electrically coupled to the ground, and the drain terminal of the second N-type transistor being electrically coupled to the second terminal of the seventh resistor;

an eighth resistor having a first terminal and a second terminal, the first terminal of the eighth resistor being electrically coupled to the second terminal of the seventh resistor;

a ninth resistor having a first terminal and a second terminal, the first terminal of the ninth resistor being electrically coupled to the operation-power terminal, and the second terminal of the ninth resistor being electrically coupled to the second terminal of the eighth resistor;

a P-type transistor having a gate terminal, a source terminal and a drain terminal, the gate terminal of the P-type transistor being electrically coupled to the second terminal of the eighth resistor;

a tenth resistor having a first terminal and a second terminal, the first terminal of the tenth resistor being electrically coupled to the operation-power terminal, and the second terminal of the tenth resistor being electrically coupled to the source terminal of the P-type transistor;

a diode having a positive terminal and a negative terminal, the positive terminal of the diode being electrically coupled to the drain terminal of the P-type transistor, and the negative terminal of the diode being electrically coupled to the second power-on signal terminal;

an eleventh resistor having a first terminal and a second terminal, the first terminal of the eleventh resistor being electrically coupled to the second power-on signal terminal;

a twelfth resistor having a first terminal and a second terminal, the first terminal of the twelfth resistor being electrically coupled to the second terminal of the eleventh resistor, and the second terminal of the twelfth resistor being electrically coupled to the ground; and a third N-type transistor having a gate terminal, a source terminal and a drain terminal, the gate terminal of the third N-type transistor being electrically coupled to the second terminal of the eleventh resistor, the source terminal of the third N-type transistor being electrically coupled to the ground, and the drain terminal of the third N-type transistor being electrically coupled to the second terminal of the eighth resistor.

6. The standby wake-up circuit according to claim 1, wherein the processing module comprises a register, the processing module sets a status of the register as a first predetermined value when the power controller sends out the waken signal, and sets the status of the register as a second predetermined value different from the first predetermined value when the power controller does not send out the waken signal.

* * * * *